(12) United States Patent
Ono et al.

(10) Patent No.: US 10,304,371 B2
(45) Date of Patent: May 28, 2019

(54) LIQUID CRYSTAL DRIVE APPARATUS, IMAGE DISPLAY APPARATUS AND STORAGE MEDIUM STORING LIQUID CRYSTAL DRIVE PROGRAM

(71) Applicant: CANON KABUSHIKI KAISHA, Tokyo (JP)

(72) Inventors: Masao Ono, Utsunomiya (JP); Masayuki Abe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/257,028

(22) Filed: Sep. 6, 2016

(65) Prior Publication Data
US 2017/0069246 A1 Mar. 9, 2017

(30) Foreign Application Priority Data

Sep. 8, 2015 (JP) ................. 2015-177008

(51) Int. Cl.
*G09G 3/20* (2006.01)
*G09G 3/36* (2006.01)
(Continued)

(52) U.S. Cl.
CPC ......... *G09G 3/2022* (2013.01); *G02F 1/1337* (2013.01); *G02F 1/13306* (2013.01);
(Continued)

(58) Field of Classification Search
CPC ............... G09G 3/2022; G09G 3/3611; G09G 2320/0257; G09G 2320/041;
(Continued)

(56) References Cited

U.S. PATENT DOCUMENTS 6,476,875 B2 11/2002 Correa et al.
7,535,448 B2 5/2009 Hiroki
(Continued)

FOREIGN PATENT DOCUMENTS

JP 2589567 B2 3/1997
JP 10096896 A 4/1998
(Continued)

OTHER PUBLICATIONS

Office Action issued in Japanese Appln. No. 2015-176811 dated Jan. 5, 2017.
(Continued)

*Primary Examiner* — Sejoon Ahn
(74) *Attorney, Agent, or Firm* — Rossi, Kimms & McDowell LLP

(57) ABSTRACT

The liquid crystal drive apparatus includes a tone setter that sets drive tones depending on input tones that are tones of an input image, a driver that controls, depending on the drive tones, a voltage applied to each of multiple pixels of a liquid crystal element to a first voltage or a second voltage lower than the first voltage in respective multiple sub-frame periods included in one frame period to cause that pixel to form a tone or controls a drive voltage applied to each of the multiple pixels, and a temperature detector that detects a temperature of or around the liquid crystal element. The tone setter changes, when the input tones include a first tone and a second tone higher than the first tone, the drive tone for the second tone depending on the detected temperature.

6 Claims, 7 Drawing Sheets

(51) Int. Cl.
*G02F 1/1337* (2006.01)
*G02F 1/133* (2006.01)

(52) U.S. Cl.
CPC ... *G09G 3/3611* (2013.01); *G09G 2320/0257* (2013.01); *G09G 2320/041* (2013.01); *G09G 2320/066* (2013.01); *G09G 2320/0646* (2013.01)

(58) Field of Classification Search
CPC ...... G09G 2320/0646; G09G 2320/066; G02F 1/13306; G02F 1/1337
See application file for complete search history.

(56) References Cited

U.S. PATENT DOCUMENTS

| | | |
|---|---|---|
| 7,982,755 B2 | 7/2011 | Ochi et al. |
| 8,063,897 B2 | 11/2011 | Mamba et al. |
| 8,223,091 B2 | 7/2012 | Ishihara et al. |
| 8,471,874 B2 | 6/2013 | Sato et al. |
| 8,823,617 B2 | 9/2014 | Kurosawa |
| 8,963,967 B2 | 2/2015 | Yoshinaga |
| 9,013,523 B2 | 4/2015 | Kajiyama et al. |
| 9,058,767 B2 | 6/2015 | Toyooka |
| 9,241,092 B2 | 1/2016 | Kitagawa et al. |
| 2002/0097207 A1 | 7/2002 | Pfeiffer et al. |
| 2003/0214463 A1 | 11/2003 | Lim et al. |
| 2005/0073616 A1 | 4/2005 | Joo et al. |
| 2005/0162360 A1* | 7/2005 | Ishihara ............... G09G 3/2011 345/89 |
| 2006/0038501 A1* | 2/2006 | Koyama ............... G09G 3/3216 315/169.3 |
| 2007/0018945 A1* | 1/2007 | Machida ............... G09G 3/344 345/107 |
| 2008/0062162 A1* | 3/2008 | Mamba ............... G09G 3/3648 345/213 |
| 2008/0088554 A1* | 4/2008 | Lee ...................... G09G 3/3406 345/87 |
| 2008/0284700 A1 | 11/2008 | Oke et al. |
| 2009/0058890 A1 | 3/2009 | Kurihara |
| 2011/0164072 A1* | 7/2011 | Kosuge ............... G02F 1/13306 345/690 |
| 2011/0248979 A1 | 10/2011 | Nishimura |
| 2011/0249050 A1* | 10/2011 | Ozawa ............... B41J 2/04528 347/10 |
| 2012/0154555 A1 | 6/2012 | Iwanaka et al. |
| 2012/0262501 A1 | 10/2012 | Toyooka |
| 2013/0050286 A1 | 2/2013 | Yoshinaga et al. |
| 2013/0050304 A1 | 2/2013 | Yoshinaga |
| 2013/0050305 A1 | 2/2013 | Yoshinaga |
| 2013/0135272 A1* | 5/2013 | Park ..................... G09G 3/3233 345/211 |
| 2014/0062981 A1* | 3/2014 | Huang ................. G09G 3/3648 345/211 |
| 2017/0124959 A1* | 5/2017 | Kim ...................... G09G 3/3225 |

FOREIGN PATENT DOCUMENTS

| | | |
|---|---|---|
| JP | 2000163019 A | 6/2000 |
| JP | 2002236472 A | 8/2002 |
| JP | 2004309843 A | 11/2004 |
| JP | 2015173573 A | 6/2005 |
| JP | 2006171651 A | 6/2006 |
| JP | 2006201630 A | 8/2006 |
| JP | 2007316381 A | 12/2007 |
| JP | 2008009391 A | 1/2008 |
| JP | 2008033276 A | 2/2008 |
| JP | 2008065167 A | 3/2008 |
| JP | 2008176286 A | 7/2008 |
| JP | 2008268286 A | 11/2008 |
| JP | 2009020335 A | 1/2009 |
| JP | 2009162937 A | 7/2009 |
| JP | 2009294266 A | 12/2009 |
| JP | 2010250043 A | 11/2010 |
| JP | 2011221215 A | 11/2011 |
| JP | 2012103356 A | 5/2012 |
| JP | 2012128197 A | 7/2012 |
| JP | 2012203052 A | 10/2012 |
| JP | 2012226041 A | 11/2012 |
| JP | 2012242435 A | 12/2012 |
| JP | 2013050679 A | 3/2013 |
| JP | 2013050682 A | 3/2013 |
| JP | 2031050681 A | 3/2013 |
| JP | 2013195488 A | 9/2013 |

OTHER PUBLICATIONS

Office Action issued in Japanese Appln. No. 2015-177008 dated Jan. 31, 2017.
Refusal issued in Japanese Appln. No. 2015-176773 dated Jan. 31, 2017.
Refusal issued in Japanese Appln. No. 2015-176886 dated Jan. 31, 2017.
Extended European Search Report issued in European Appln No. 16001835.4 dated Feb. 2, 2017.
Office Action issued in Japanese Appln. No. 2015-176773, dated Sep. 6, 2016.
Office Action issued in Japanese Appln. No. 2015-176886, dated Sep. 6, 2016.
Office Action issued in Japanese Appln. No. 2015-177008, dated Sep. 13, 2016.
Office Action issued in Japanese Appln. No. 2015-176811, dated Aug. 23, 2016.
Office Action issued in U.S. Appl. No. 15/253,976 dated Apr. 4, 2018.
Notice of Allowance issued in U.S. Appl. No. 15/253,976 dated Aug. 28, 2018.
Notice of Allowance issued in U.S. Appl. No. 15/254,355 dated Oct. 24, 2018.
Notice of Allowance issued in U.S. Appl. No. 15/254,401 dated Sep. 21, 2018.
Office Action issued in U.S. Appl. No. 15/254,355 dated May 18, 2018.

* cited by examiner

FIG. 4A
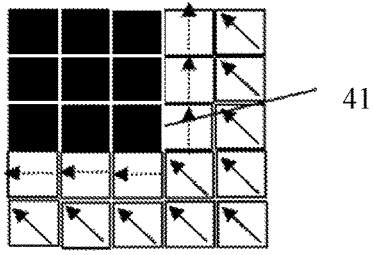
FIG. 4B
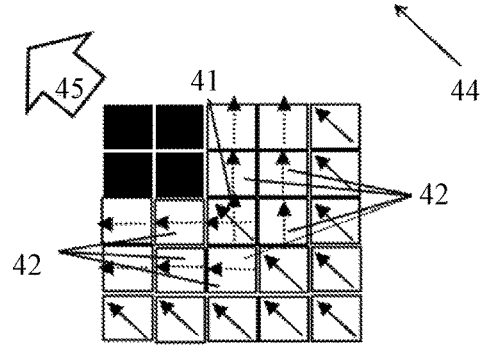
FIG. 4C
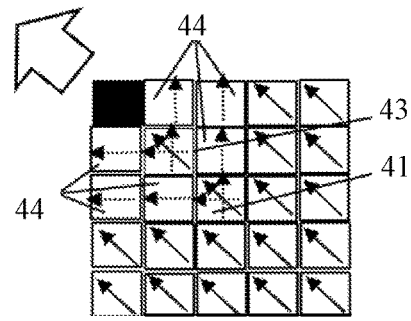
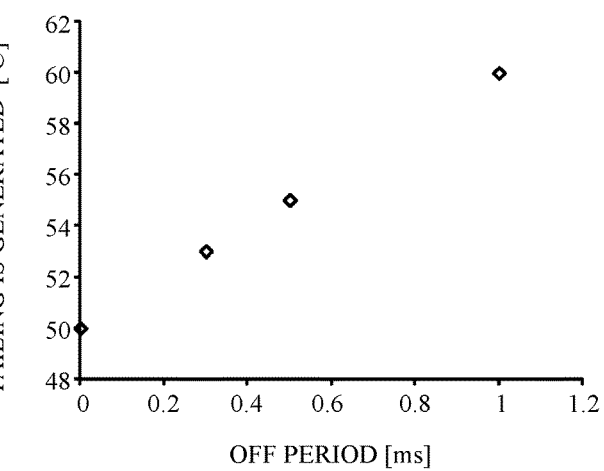
FIG. 5

LIQUID CRYSTAL DRIVE APPARATUS, IMAGE DISPLAY APPARATUS AND STORAGE MEDIUM STORING LIQUID CRYSTAL DRIVE PROGRAM

BACKGROUND OF THE INVENTION

Field of the Invention

The present invention relates to a disclination correction performed on a liquid crystal element.

Description of the Related Art

Liquid crystal elements are used in many display apparatuses each displaying images such as direct-view monitors and liquid crystal projectors. FIG. 11 schematically illustrates a structure of a liquid crystal element. The liquid crystal element includes, between a common electrode 1001 and multiple pixel electrodes 1002, a liquid crystal layer containing liquid crystal molecules 103 (only one liquid crystal molecule is illustrated in the drawing). A voltage applied on each of the pixel electrodes 1002 (that is, a potential difference between the common electrode 1001 and that pixel electrode 1002) is changed depending on a tone of a video signal. Changing the voltage applied on the pixel electrode 1002 enables controlling a direction of the liquid crystal molecule 1003 and thereby controlling an amount of light exiting from a pixel including the liquid crystal molecule 1003 (that is, a display tone of the pixel). Controlling the directions of the liquid crystal molecules 1003 in multiple pixels on the liquid crystal element enables displaying a video image.

The direction of the liquid crystal molecule 1003 is defined by a polar angle $\theta$ and an azimuth angle $\phi$ in a spherical coordinate system illustrated in FIG. 11. The polar angle $\theta$ is changeable depending on the potential difference (absolute value) between the common electrode 1001 and the pixel electrode 1002. In a liquid crystal display element of a so-called normally black mode, an increase in the potential difference increases the polar angle $\theta$ and increases the display tone. On the other hand, the azimuth angle $\phi$ becomes a specific angle (pre-tilt azimuth angle) due to a weak alignment regulating force caused by an alignment film formed on surfaces of the common electrode 1001 and the pixel electrode 1002.

However, the liquid crystal display element has a commonly known problem, namely, disorder in alignment of the liquid crystal molecules, which is so-called disclination, and a decrease in image quality due to the disclination. FIG. 10 illustrates an example of generation of the disclination. When an image containing a white background and a black line 901 extending vertically is displayed as illustrated in FIG. 10, a dark line (disclination line) 902 due to the disclination, which is caused by a difference in potential difference (drive voltage) between mutually adjacent pixels, is generated in pixels adjacent right to pixels displaying the black line 901. Description will be made of directions of liquid crystal molecules in a pixel 900 in which the disclination is generated with referring to FIG. 9A.

In FIG. 9A, multiple liquid crystal molecules 801 contained in the pixel 900 in which the disclination is generated have a pre-tilt azimuth angle set by the alignment film formed on the surface of the electrode such that the molecules 801 are oriented in a pre-tilt direction 803 expressed by a dashed-dotted line extending in an upper left and lower right direction in the drawing. In addition, the polar angle of each liquid crystal molecule 801 that is an angle formed with respect to a normal to a plane of the drawing changes depending on the drive voltage, which provides tones from black to white. The drawing illustrates an example of a negative liquid crystal whose liquid crystal molecules 801 are oriented in a direction vertical to the plane of the drawing in a state in which the drive voltage is not applied and are oriented in a direction parallel to the plane of the drawing (and in the pre-tilt direction 803) in a state in which the drive voltage is applied. In the pixel 900, multiple liquid crystal molecules 802 located in an area adjacent to the pixel (black display pixel) displaying the black line 901 in FIG. 10 are affected by the difference in potential difference from the black display pixel and thus are oriented in a direction 804 different from the pre-tilt direction 803 (that is, a direction parallel to a vertical side of the pixel 900). Consequently, as illustrated in FIG. 10, the disclination line 902 is generated in the pixel 900.

Japanese Patent Laid-Open No. 2012-203052 discloses an image processing method of decreasing a difference in a tone level of a target pixel from that of an adjacent pixel in order to reduce the generation of the disclination in the target pixel.

In addition, a condition of the generation of the disclination depends not only on a magnitude of the difference in potential difference from the adjacent pixel, but also on a relation between a direction of a gradient of the potential difference and the pre-tilt azimuth angle. A pixel 903 illustrated in FIG. 10 is a pixel whose sign of the gradient of the potential difference with respect to the pre-tilt direction 803 is inverse to that of the pixel 900. In such a pixel 903, as illustrated in FIG. 9B, though a direction 806 of liquid crystal molecules 805 slightly changes with respect to the pre-tilt direction 803 illustrated in FIG. 9A due to an influence of the difference in potential difference from the adjacent pixel, the direction 806 does not become parallel to the vertical side of the pixel 903. For this reason, the disclination is not generated in the pixel 903.

Furthermore, displaying on the liquid crystal element a moving image constituted by continuous frame images each generating the disclination in the liquid crystal element results in a degradation in image quality that is a so-called disclination tailing. FIG. 8 illustrates a state in which a disclination tailing 703 is generated in a displayed moving image (between multiple frame images) containing a white background and a black rectangle. At a right side and a lower side of the black rectangle, disclination lines 701 and 702 are generated. When the black rectangle moves in a direction in which the disclination remains, a temporal residue of the disclination in its reducing process seems like a tail. In particular, when, as indicated by a white-filled arrow in the drawing, a movement direction of the black rectangle is an oblique direction opposite to a convex direction of a white-background side corner portion of the black rectangle (that is, an upper left oblique direction in the drawing), the disclination tailing 703 noticeably appears.

Reducing the generation of the disclination using the method disclosed in Japanese Patent Laid-Open No. 2012-203052 enables reducing the generation of the disclination tailing caused thereby. However, the disclination (namely, the disclination tailing) is likely to be generated when a temperature of the liquid crystal element is higher than a specific temperature (for example, 50° C.). In other words, the disclination tailing is not likely to be generated when the temperature of the liquid crystal element is lower than the specific temperature. Therefore, implementing the method disclosed in Japanese Patent Laid-Open No. 2012-203052 regardless of the temperature of the liquid crystal element may undesirably decrease a brightness or a contrast of a displayed image.

SUMMARY OF THE INVENTION

The present invention provides a liquid crystal drive apparatus capable of reducing generation of a disclination tailing without decreasing a brightness and a contrast of a displayed image. The present invention further provides an image display apparatus including the liquid crystal drive apparatus.

The present invention provides as an aspect thereof a liquid crystal drive apparatus configured to drive a liquid crystal element depending on an input image. The apparatus includes a tone setter configured to set drive tones depending on input tones that are tones of the input image, a driver configured to control, depending on the drive tones, a voltage applied to each of multiple pixels of the liquid crystal element to a first voltage or a second voltage lower than the first voltage in respective multiple sub-frame periods included in one frame period or configured to control a drive voltage applied to each of the multiple pixels, to cause that pixel to form a tone, and a temperature detector configured to detect a temperature of or around the liquid crystal element. The tone setter is configured to change, when the input tones include a first tone and a second tone higher than the first tone, the drive tone for the second tone depending on the detected temperature.

The present invention provides as another aspect thereof an image display apparatus including a liquid crystal element, and the above liquid crystal drive apparatus.

The present invention provides as still another aspect thereof a non-transitory computer-readable storage medium storing a liquid crystal drive program as a computer program to cause a computer as the above liquid crystal drive apparatus to drive the liquid crystal element.

Further features and aspects of the present invention will become apparent from the following description of exemplary embodiments with reference to the attached drawings.

BRIEF DESCRIPTION OF THE DRAWINGS

FIGS. 4A to 4C illustrate a generation mechanism of a disclination tailing.

FIG. 5 illustrates a relation between temperatures at which the disclination tailing is generated and OFF periods in a PWM drive.

DESCRIPTION OF THE EMBODIMENTS

Exemplary embodiments of the present invention will be described below with reference to the attached drawings.

Embodiment 1

Figure 1:
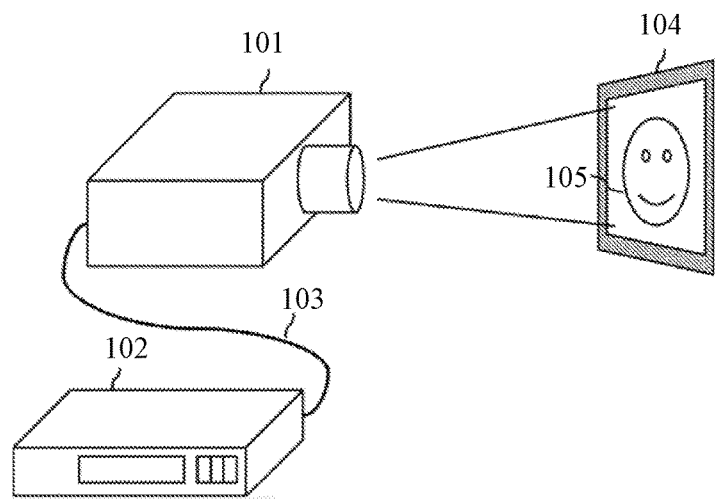
FIG. 1 illustrates a liquid crystal projector that is Embodiment 1 of the present invention.

FIG. 1 illustrates a liquid crystal projector 101 as an image display apparatus that is a first embodiment (Embodiment 1) of the present invention. Although this embodiment and subsequent embodiments will each describe a liquid crystal projector as an example of image display apparatuses each using a liquid crystal element, processes described later can be performed also in other image display apparatuses using the liquid crystal element, such as a direct-view monitor.

A video image signal, which is an external video image signal, output from a video player 102 is input to the projector 101 via a video cable 103. The projector 101 generates, from the external video image signal, an output video image signal suitable for use in display and drives the liquid crystal element depending on the output video image signal to project a video image (projected image) 105 onto a projection surface 104 such as a screen.

Figure 2:
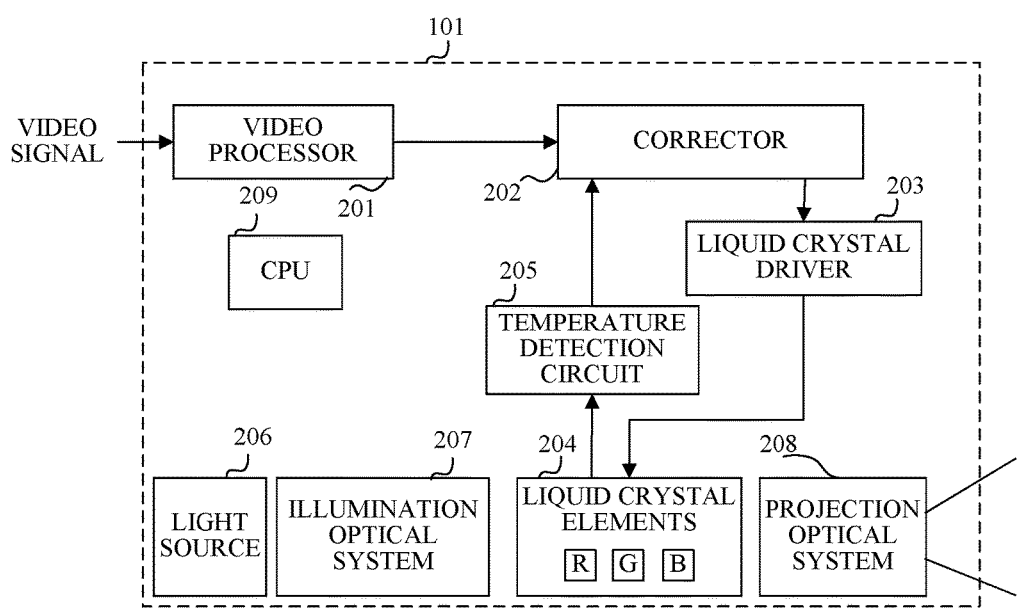
FIG. 2 illustrates a configuration of the projector of Embodiment 1.

FIG. 2 illustrates an internal configuration of the projector 101. The external video image signal input to the projector 101 is converted by an video processor 201 into input image data for each of frame images. The input image data are subjected to various video processes such as a brightness correction process, a contrast correction process, a gamma conversion process and a color conversion process.

A corrector (tone setter) 202 is configured to convert input tones that are tones of the input image data subjected to the video processes into drive tones for driving the liquid crystal element 204, that is, configured to set the drive tones depending on the input tones. The corrector 202 performs, with the conversion of the input tones into the drive tones, a disclination trailing reduction process as a liquid crystal drive process to set (change) the drive tones for reducing (or avoiding) a disclination trailing. The disclination trailing reduction process will be described later.

Figure 12:
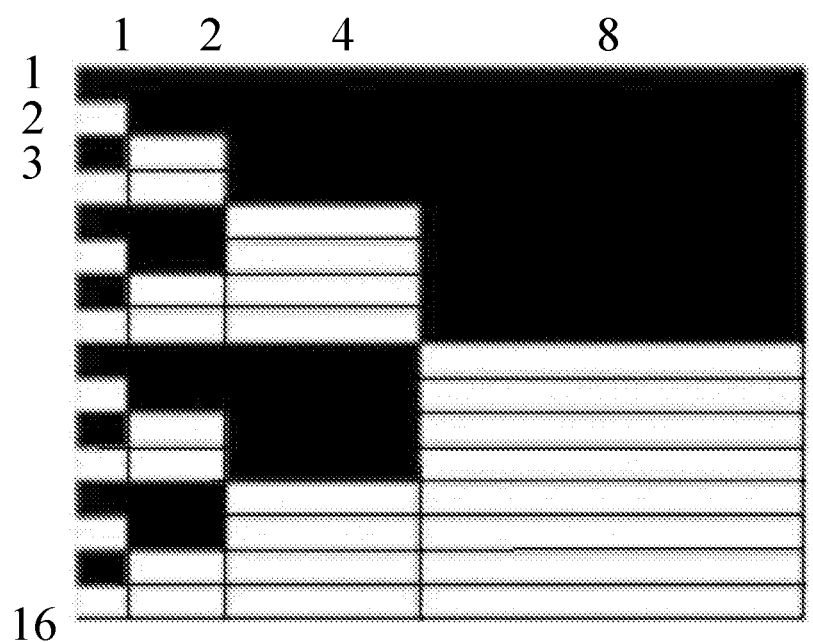
FIG. 12 illustrates the PWM drive of the liquid crystal element.

The drive tones set by the corrector 202 is input to a liquid crystal driver 203. The liquid crystal driver (hereinafter simply referred to as "a driver") 203 divides, as illustrated in FIG. 12, one frame period in which the liquid crystal element 204 displays one frame image into multiple sub-frame periods. Then, the driver 203 produces, as illustrated in FIG. 12, an ON/OFF pattern (PWM drive pattern) indicating application and non-application of a predetermined voltage to each of multiple pixels on the liquid crystal element 204 in the respective sub-frame periods to control the application of the predetermined voltage to that pixel (that is, to control drive of the liquid crystal element 204) according to the ON/OFF pattern. In the ON/OFF pattern, the "ON" (indicated by white in FIG. 12) indicates that a first voltage as the predetermined voltage is applied to the pixel, and the "OFF" (indicated by black in FIG. 12) indicates that the first voltage is not applied (in other words, a second voltage lower than the first voltage is applied).

The control of the ON and OFF causes the liquid crystal element 204 to display (form) tones. The liquid crystal element 204 is thus driven by a digital drive method (PWM drive method). The liquid crystal element 204 is provided for each of R, G and B colors. Each of the liquid crystal elements 204 displays a video image (continuous frame images) corresponding to each color.

The liquid crystal element 204 includes a temperature detection circuit (temperature detector) 205 that enables detecting (acquiring) a temperature inside the liquid crystal element 204 (in other words, a temperature of the liquid crystal element 204). The temperature detection circuit 205 may be provided near and outside the liquid crystal element 204 to detect a temperature around the liquid crystal element 204. In the following description, the temperature of or around the liquid crystal element 204 detected by the temperature detection circuit 205 is collectively referred to as "a temperature of the liquid crystal element 204".

A white light from a light source 206 is separated into three (R, G and B) color lights by an illumination optical system 207. The three color lights respectively enter three liquid crystal elements 204 and are image-modulated by the liquid crystal elements 204. The image-modulated three color lights are combined into one combined light. The combined light is projected through a projection optical system 208 onto a projection surface 104.

A CPU 209 as a main controller is configured to control the processes performed by the video processor 201 and the corrector 202 and to control lighting of the light source 206 and drive of the liquid crystal element 204 through the driver 203. The CPU 209, the video processor 201, the corrector 202, the driver 203 and the temperature detection circuit 205 constitute a liquid crystal drive apparatus.

Next, description will be made of a generation mechanism of the disclination tailing with referring to FIGS. 4A to 4C. FIGS. 4A to 4C illustrate 5×5 rectangular pixels of the liquid crystal element 204 on which continuous multiple (three) frame images constituting part of a video image (motion image signal) are displayed. In the following description, each of the pixels of the liquid crystal element 204 is referred to as "a liquid crystal pixel". An arrow in each liquid crystal pixel indicates a direction of multiple liquid crystal molecules contained in that liquid crystal pixel. Each arrow indicates that its base side is located on a lower side in a direction vertical to a plane of each of FIGS. 4A to 4C and that its arrowhead side is located on an upper side in that direction.

Each of the frame images is an image in which a white background area (second image area) is adjacent in vertical, horizontal and oblique (or diagonal) directions to a corner portion of a black rectangle area (first image area). In order of FIG. 4A, FIG. 4B and FIG. 4C, the black rectangle area including the corner portion sequentially moves one pixel by one pixel in the oblique direction (hereinafter referred to as "an oblique movement direction") 45 opposite to a convex direction of the corner portion in a previous frame image. In the following description, each of pixels in the frame image is referred to as "an image pixel", and the liquid crystal pixel corresponding to the image pixel in the black rectangle area or the white background area is simply referred to as "a liquid crystal pixel of the black rectangle area" or "a liquid crystal pixel of the white background area". The frame image illustrated in FIG. 4A is the previous frame image when the two frame images illustrated in FIGS. 4A and 4B are respectively regarded as previous and subsequent frame images. The frame image illustrated in FIG. 4B is the previous frame image when the two frame images illustrated in FIGS. 4B and 4C are respectively regarded as previous and subsequent frame images.

Although FIGS. 4A to 4C illustrate, as an example, a case where the oblique movement direction 45 is identical to the oblique direction in which the liquid crystal pixels are mutually adjacent, the corner portion may be moved in a direction different from the oblique movement direction 45 illustrated in FIGS. 4A to 4C as long as that direction is other than the vertical and horizontal directions and is opposite to the convex direction of the corner portion of the previous frame image.

In a liquid crystal pixel (first pixel) 41 forming an apex of the corner portion of the black rectangle area illustrated in FIG. 4A, the liquid crystal molecules are oriented in an upward vertical direction to the plane of FIG. 4A as illustrated beside reference numeral 41. On the other hand, among the liquid crystal pixels of the white background area, six liquid crystal pixels (second pixels) adjacent in the horizontal direction (on a right side) and the vertical direction (on a lower side) to two sides of the black rectangle area including the corner portion are in a state where the disclination is generated. That is, as indicated by dotted arrows, the liquid crystal molecules of the six liquid crystal pixels are oriented, due to the disclination, in directions different from a normal alignment direction (pre-tilt direction) 44 in a white display state where these pixels display white. However, the direction different from the normal alignment direction is, for the liquid crystal pixels adjacent to the right side of the black rectangular area, a direction parallel to that right side (in other words, to left sides of the liquid crystal pixels) and is, for the liquid crystal pixels adjacent to the lower side of the black rectangle area, a direction parallel to that lower side (in other words, to upper sides of the liquid crystal pixels). That is, the directions of the liquid crystal molecules of the six liquid crystal pixels (hereinafter each referred to as "a disclination pixel") in which the disclination is generated are different from the normal alignment direction, but are fixed in specific directions.

In the white background area, the directions of the liquid crystal molecules of the liquid crystal pixels other than the six disclination pixels, which include one liquid crystal pixel adjacent in the oblique direction to the liquid crystal pixel 41, are the pre-tilt direction 44.

In FIG. 4B, with the movement of the black rectangle area, the liquid crystal pixel 41 is brought into a state in which a voltage for white display is applied (the state is hereinafter referred to as "a white voltage applied state"). In this embodiment, although the liquid crystal element 204 is digitally driven, the description uses analog drive-like expressions for simplification. In this white voltage applied state, the directions of the liquid crystal molecules of the liquid crystal pixel 41 is supposed to be the pre-tilt direction 44. However, the liquid crystal pixel 41 is surrounded by a large number of (in the drawing, six) disclination pixels 42 in which the directions of the liquid crystal molecules are disordered due to the disclination. For this reason, the liquid crystal molecules of the liquid crystal pixel 41 are oriented, by interactions with the liquid crystal molecules of the disclination pixels 42 surrounding the liquid crystal pixel 41, in directions following the directions of the liquid crystal molecules of the disclination pixels 42. Thus, the directions of the multiple liquid crystal molecules contained in the liquid crystal pixel 41 are not fixed to the pre-tilt direction 44 or another specific direction, that is, include various directions.

That is, the liquid crystal pixel 41 is brought into a state where the liquid crystal molecules oriented in the various directions are mixed, which means that the liquid crystal pixel 41 is not in the white display state. In the following description, the state in which the liquid crystal molecules oriented in the various directions are mixed, that is, a state in which the directions of the liquid crystal molecules are unfixed is referred to also as "an unfixed liquid crystal direction state". The unfixed liquid crystal direction state is regarded as being different from a simple disclination in which the directions of the liquid crystal molecules are not normal but are fixed (stable). Even when the liquid crystal pixel containing the liquid crystal molecules whose directions are unfixed (the pixel is hereinafter referred to also as "an unfixed liquid crystal direction pixel") is brought into the white voltage applied state, a long period of time from approximately several hundred microseconds to several seconds is required to make the directions of the multiple liquid crystal molecules contained in the liquid crystal pixel stably aligned in the pre-tilt direction 44. That is, during this period of time, that liquid crystal pixel remains as the unfixed liquid crystal direction pixel and thus does not change into the white display state.

Figure 8:
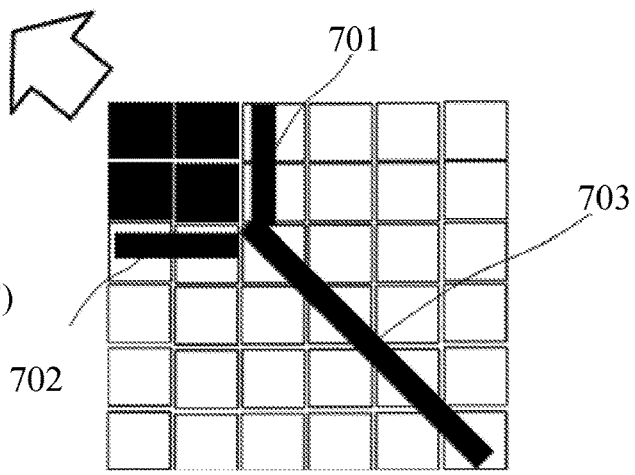
FIG. 8 illustrates a disclination tailing.
Figure 9A:
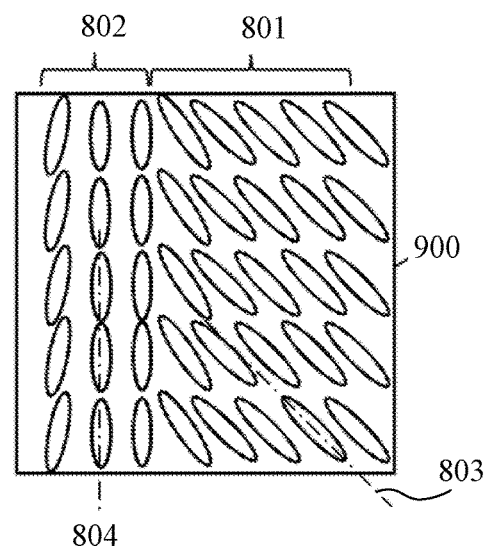
FIGS. 9A and 9B illustrate directions of liquid crystal molecules in a liquid crystal pixel in which disclination is generated.
Figure 9B:
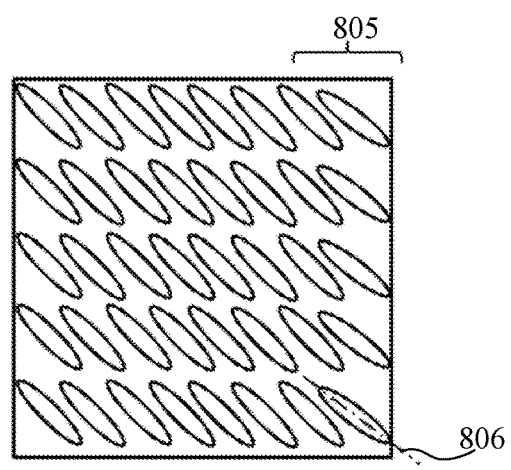
Figure 10:
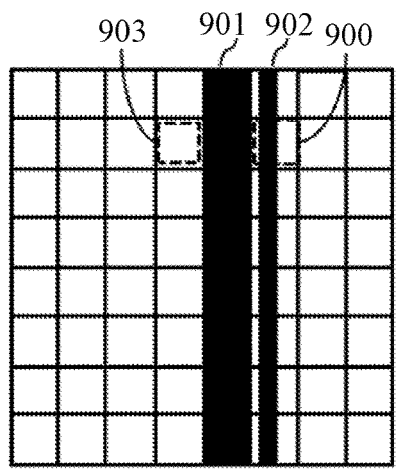
FIG. 10 illustrates an example of the disclination.
Figure 11:
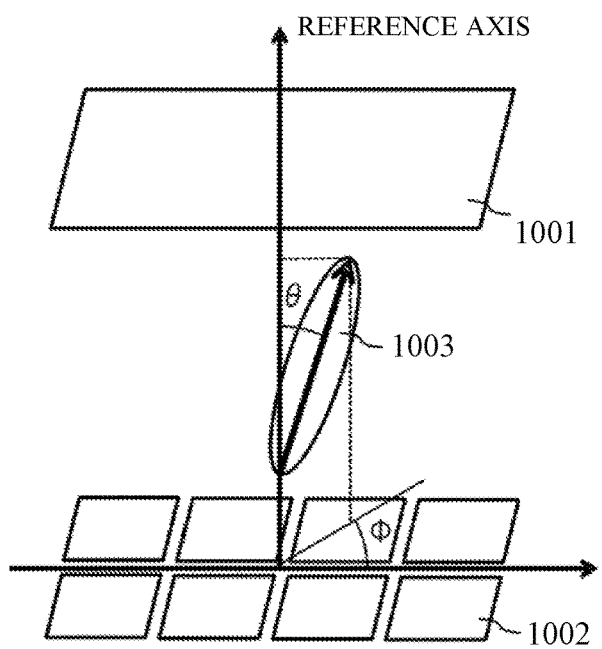
FIG. 11 illustrates a structure of a liquid crystal element.

In FIG. 4C, with a further movement of the black rectangle area, a liquid crystal pixel 43 having formed the apex of the corner portion of the black rectangle area is also brought into the white voltage applied state. However, the movement of the black rectangle area generates new disclination pixels along the two sides of the black rectangle area and thereby the liquid crystal pixel 43 is surrounded by a large number of (six) disclination pixels 44, similarly to the liquid crystal pixel 41 in FIG. 4B. For this reason, the liquid crystal molecules of the liquid crystal pixel 43 become the unfixed liquid crystal direction state and therefore the liquid crystal pixel 43 does not change into the white display state for a long period of time. Such sequential generation of the liquid crystal pixels (unfixed liquid crystal direction pixels) each not normally changing into the white display state for a long period of time with continuous display of the frame images generates the disclination tailing extending long from the apex of the corner portion of the black rectangle area in the oblique direction (as illustrated in FIG. 8).

FIG. 5 illustrates a relation between temperatures (indicated by a vertical axis) at which the disclination tailing is generated and the OFF periods (indicated by a horizontal axis) in the ON/OFF pattern in the digital (PWM) drive of the liquid crystal element, that is, total lengths of sub-frame periods in which the first voltage is not applied to the liquid crystal pixel in one frame period.

As illustrated in FIG. 5, the disclination tailing is generated when the temperature of the liquid crystal element is higher than the specific temperature (50° C.) and is generated even though the OFF period further increases (that is, the drive tone decreases) as the temperature further increases from the specific temperature. On the other hand, when the temperature of the liquid crystal element is lower than the specific temperature, the disclination tailing is not generated. A liquid crystal pixel (center pixel) is brought into the unfixed liquid crystal direction state by being affected by the disclination in liquid crystal pixels (peripheral pixels) around the center pixel. That is, a higher temperature than the specific temperature causes the disclination in the peripheral pixels, and thereby the center pixel is released from an alignment regulating force from the peripheral pixels and thus is brought into the unfixed liquid crystal direction state. That is, the generation and non-generation of the disclination can be definitely determined using a temperature threshold.

Thus, this embodiment sets whether or not to perform the disclination tailing reduction process depending on whether or not the temperature of the liquid crystal element is higher than the temperature threshold at which the disclination is likely to be generated. This setting enables sufficiently reducing the disclination tailing when the disclination tailing is likely to be generated in the liquid crystal element and avoiding a brightness and a contrast of a displayed image due to performing the disclination tailing reduction process when the disclination tailing is not generated.

Figure 6:
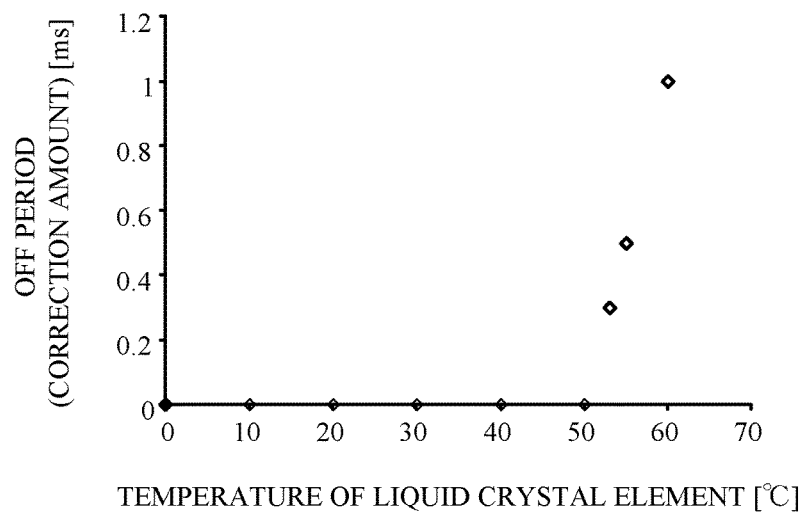
FIG. 6 illustrates a relation between temperatures of the liquid crystal element and correction amounts.

FIG. 6 illustrates the disclination tailing reduction process (liquid crystal drive process) in this embodiment. This process sets, until the temperature of the liquid crystal element 204 increases to the specific temperature (50° C.), the drive tone such that the OFF period in the ON/OFF pattern for the input tone of white becomes minimum (0). In other words, the process sets the drive tone such that the ON period (a total length of the sub-frame periods in which the first voltage is applied to the liquid crystal element in the one frame period) in the ON/OFF pattern becomes maximum. Then, when the temperature of the liquid crystal element is higher than the specific temperature, the process changes the drive tone so as to increase the OFF period (that is, decrease the ON period) as the temperature increases.

As just described, this embodiment performs, when the input tone for the first pixel in the liquid crystal pixels is the first tone (black) and the input tone for the second pixel adjacent to the first pixel is the second tone (white) higher than the first tone, the disclination tailing reduction process for the second pixel. Specifically, as illustrated in FIGS. 4A to 4C, when the frame image as the input image includes the black rectangle area including the corner portion and the white background area vertically, horizontally and obliquely adjacent to the corner portion, the disclination tailing reduction process is performed.

The disclination tailing reduction process changes, depending on the temperature of the liquid crystal element 204, the drive tone for the second pixel so as to change the ON period and the OFF period for the second pixel. Specifically, the process changes, when the temperature of the liquid crystal element 204 is higher than a predetermined temperature (the specific temperature described with referring to FIG. 6), the drive tone such that, as compared with when the temperature is lower than the predetermined temperature, the ON period for the second pixel decreases and the OFF period therefor increases. Furthermore, the process changes the drive tone such that, as the temperature of the liquid crystal element 204 increases, the ON period for the second pixel further increases and the OFF period therefor further decreases.

This process enables, when the temperature of the liquid crystal element 204 is lower than the predetermined temperature and therefore the disclination is not generated, driving the liquid crystal element so as not to decrease the brightness and contrast of the displayed image. On the other hand, this process also enables, when the temperature of the liquid crystal element 204 is higher than the predetermined temperature and therefore the disclination is likely to be generated, reducing the generation of the disclination tailing at each temperature, without decreasing the brightness and contrast of the displayed image.

Figure 3:
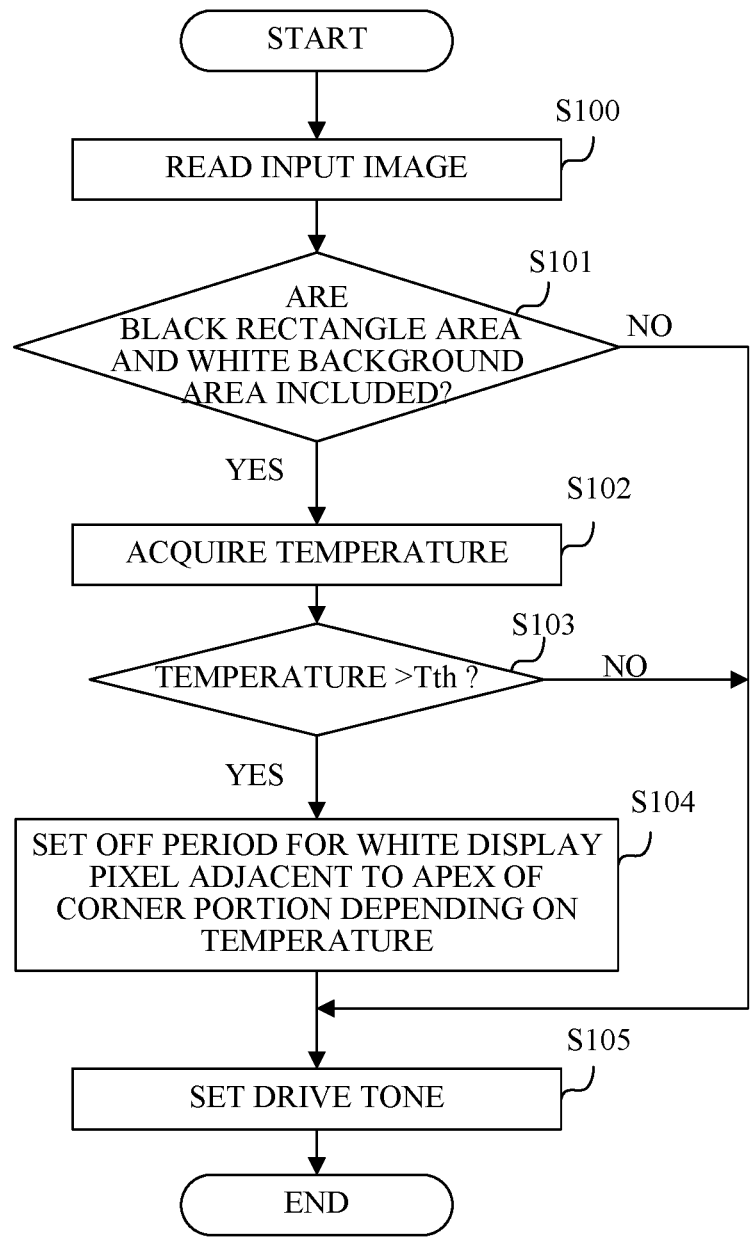
FIG. 3 is a flowchart of a disclination tailing reduction process in Embodiment 1.

FIG. 3 is a flowchart of the disclination tailing reduction process performed by the corrector 202 in the liquid crystal drive apparatus. The corrector 202 is constituted by a computer and performs this process according to a liquid crystal drive program as a computer program.

At step S100, the corrector 202 reads a frame image as an input image from the video processor 201 to acquire tones (input tones) of all pixels of the frame image.

Next, at step S101, the corrector 202 determines whether or not the read frame image includes a black rectangle area including a corner portion and a white background area vertically, horizontally and obliquely adjacent to the corner portion. If the frame image includes these areas, the corrector 202 proceeds to step S102, and otherwise proceeds to step S105.

At step S102 (temperature acquisition process), the corrector 202 acquires a temperature of the liquid crystal element 204 from the temperature detection circuit 205.

Next, at step S103, the corrector 202 determines whether or not the temperature of the liquid crystal element 204 is higher than a predetermined temperature Tth. If the temperature of the liquid crystal element 204 is higher than the predetermined temperature Tth, the corrector 202 proceeds to step S104, and the temperature of the liquid crystal element 204 is not higher than the predetermined temperature Tth, the corrector 202 proceeds to step S105.

At step S104 (tone setting process), the corrector 202 sets, depending on the temperature of the liquid crystal element 204, an OFF period (and an ON period) for a liquid crystal pixel (hereinafter referred to as "a correction target pixel") among liquid crystal pixels of the white background area; the correction target pixel is adjacent to an apex of the corner portion in the black rectangle area. Specifically, as described above, the corrector 202 increases the OFF period (decreases the ON period) for the correction target pixel as the temperature of the liquid crystal element 204 increases. Increasing the OFF period corresponds to decreasing a drive tone of the correction target pixel from its input tone (white).

Then, at step S105 (tone setting and drive processes), the corrector 202 sets the drive tone for the correction target pixel such that the correction target pixel is driven with the OFF period (and the ON period) set at step S104 and outputs the drive tone to the driver 208. The corrector 202 sets, for other liquid crystal pixels than the correction target pixel, drive tones corresponding to the input tones. When proceeding from steps S101 or S104 to step S105, the corrector 202 outputs, to the driver 208, drive tones for driving all the liquid crystal pixels at tones corresponding to the input tones of the frame image.

Embodiment 2

Figure 7:
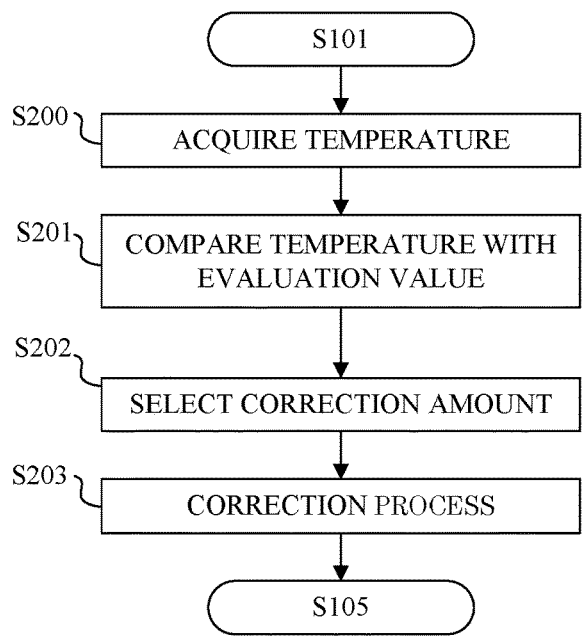
FIG. 7 illustrates a flowchart of a disclination tailing reduction process in Embodiment 2 of the present invention.

Next, description will be made of a second embodiment (Embodiment 2) of the present invention. Constituent elements in this embodiment common to those of Embodiment 1 are denoted by the same reference numerals as those in Embodiment 1. FIG. 7 is a flowchart of processes performed by the corrector 202 instead of steps S102 to S104 in the disclination tailing reduction process described in Embodiment 1 with referring to FIG. 3. A corrector 202 in this embodiment is also constituted by a computer and performs these processes according to a liquid crystal drive program as a computer program.

The corrector 202, which has determined at step S101 in FIG. 3 that the frame image includes the black rectangle area and the white background area, acquires at step S200 (temperature acquisition process) a temperature of the liquid crystal element 204 from the temperature detection circuit 205.

Next, at step S201, the corrector 202 compares the temperature acquired at step S200 with an evaluation value stored in a memory in the corrector 202.

Then, at step S202, the corrector 202 selects a correction amount depending on a comparison result at step S201, that is, depending on the temperature of the liquid crystal element 204. In this embodiment, the corrector 202 selects, as illustrated in FIG. 6, when the temperature of the liquid crystal element 204 is higher than the specific temperature (50° C.), a correction amount for increasing the OFF period (decreasing the ON period) as the temperature increases.

Next, at step S203 (tone setting and drive processes), the corrector 202 increases or decreases the OFF period for all the pixels of the liquid crystal element 204, depending on the correction amount selected at step S202.

Then, at step S105 (tone setting and drive processes) in FIG. 3, the corrector 202 sets drive tones such that all the pixels are driven with the OFF period (and the ON period) set at step S203 and outputs the drive tones to the driver 208.

This embodiment also enables, when the temperature of the liquid crystal element 204 is lower than a predetermined temperature (specific temperature) and therefore the disclination is not generated, driving the liquid crystal element 204 so as not to decrease a brightness and a contrast of a displayed image. On the other hand, this embodiment also enables, when the temperature of the liquid crystal element 204 is higher than the predetermined temperature and therefore the disclination is likely to be generated, reducing the generation of the disclination tailing at each temperature, without decreasing the brightness and contrast of the displayed image.

Embodiment 3

Although Embodiments 1 and 2 described the case where the liquid crystal element 204 is driven by the digital drive method, the liquid crystal element 204 may be driven by an analog drive method.

In this case, the corrector 202 controls at step S104, depending on the temperature of the liquid crystal element 204 acquired from the temperature detection circuit 205 at step S102 in FIG. 3 or at step S200 in FIG. 7, a drive voltage to be applied to the correction target pixel (second pixel) from the driver 203. Specifically, when the temperature of the liquid crystal element 204 is higher than a predetermined temperature Tth, the corrector 202 changes the drive tone for the correction target pixel such that the drive voltage to be applied to the correction target pixel decreases as the temperature increases. This embodiment also enables, as in Embodiment 1, when the temperature of the liquid crystal element 204 is lower than the predetermined temperature and therefore the disclination is not generated, driving the liquid crystal element so as not to decrease a brightness and a contrast of a displayed image. On the other hand, this embodiment also enables, when the temperature of the liquid crystal element 204 is higher than the predetermined temperature and therefore the disclination is likely to be generated, reducing the generation of the disclination tailing at each temperature, without decreasing the brightness and contrast of the displayed image.

As described above, each of the embodiments changes the drive tone depending on the temperature of the liquid crystal element 204 to reduce the generation of the disclination tailing. Thus, each of the embodiments enables reducing the generation of the disclination tailing without decreasing the brightness and contrast of the displayed image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-177008, filed on Sep. 8, 2015, which is hereby incorporated by reference herein in its entirety.

What is claimed is:

1. A liquid crystal drive apparatus configured to drive a liquid crystal element based on an input image, the liquid crystal element including a plurality of pixels, the apparatus comprising:
   a tone setter configured to set drive tones for each pixel of the plurality of pixels of the liquid crystal element based on a plurality of input tones of corresponding pixels of the input image;
   a driver configured to control, depending on the set drive tones, a voltage applied to each corresponding pixel of the plurality of pixels of the liquid crystal element to a first voltage or a second voltage lower than the first voltage, in respective two or more sub-frame periods included in one frame period, to cause the corresponding pixel of the liquid crystal element to form a display tone; and
   a temperature detector configured to detect a temperature of or around the liquid crystal element,
   wherein the tone setter is configured to change the drive tones to decrease, as the detected temperature increases, a drive tone corresponding to a maximum input tone of the plurality of input tones at which a period in which the first voltage is applied in the two or more sub-frame periods is maximum,
   wherein the change of one or more drive tones changes a total length of one or more first sub-frame periods, among the two or more sub-frame periods, in which the first voltage is applied to one or more corresponding pixels, and changes a total length of one or more second sub-frame periods thereamong, in which the second voltage is applied to one or more corresponding pixels, and
   wherein, when the detected temperature is higher than a predetermined temperature, as compared with when the detected temperature is lower than the predetermined temperature, the tone setter is configured to set the drive tones to decrease the total length of the one or more first sub-frame periods and increase the total length of the one or more second sub-frame periods.

2. A liquid crystal drive apparatus according to claim 1, wherein, as the detected temperature increases, the tone setter is configured to set the drive tones to further decrease the total length of the one or more first sub-frame periods and further increase the total length of the one or more second sub-frame periods.

3. A liquid crystal drive apparatus according to claim 1, wherein, when the input tone for a first pixel of the multiple pixels is a first tone and the input tone for a second pixel adjacent to the first pixel is the maximum input tone, the tone setter is configured to decrease the drive tone corresponding to the maximum input tone as the detected temperature increases.

4. A liquid crystal drive apparatus according to claim 3, wherein, when the input image includes a first image area including a corner portion and having the first tone, and a second image area vertically, horizontally or obliquely adjacent to the corner portion and having the maximum input tone,
   the first pixel is a liquid crystal pixel corresponding to an image pixel forming an apex of the corner portion in the first image area, and
   the second pixel is a liquid crystal pixel corresponding to, in the second image area, an image pixel obliquely adjacent to the image pixel forming the apex of the corner portion.

5. An image display apparatus comprising:
   a liquid crystal element including a plurality of pixels; and
   a liquid crystal drive apparatus configured to drive the liquid crystal element, wherein the liquid crystal drive apparatus comprises:
   a tone setter configured to set drive tones for each pixel of the plurality of pixels of the liquid crystal element based on a plurality of input tones of corresponding pixels of the input image;
   a driver configured to control, depending on the set drive tones, a voltage applied to each corresponding pixel of the plurality of pixels of the liquid crystal element to a first voltage or a second voltage lower than the first voltage, in respective two or more sub-frame periods included in one frame period, to cause the corresponding pixel of the liquid crystal element to form a display tone; and
   a temperature detector configured to detect a temperature of or around the liquid crystal element,
   wherein the tone setter is configured to change the drive tones to decrease, as the detected temperature increases, a drive tone corresponding to a maximum input tone of the plurality of input tones at which a period in which the first voltage is applied in the two or more sub-frame periods is maximum,
   wherein the change of one or more drive tones changes a total length of one or more first sub-frame periods, among the two or more sub-frame periods, in which the first voltage is applied to one or more corresponding pixels, and changes a total length of one or more second sub-frame periods thereamong, in which the second voltage is applied to one or more corresponding pixels, and
   wherein, when the detected temperature is higher than a predetermined temperature, as compared with when the detected temperature is lower than the predetermined temperature, the tone setter is configured to set the drive tones to decrease the total length of the one or more first sub-frame periods and increase the total length of the one or more second sub-frame periods.

6. A non-transitory computer-readable storage medium storing a liquid crystal drive program as a computer program to cause a computer to execute a liquid crystal drive process to drive a liquid crystal element including a plurality of pixels, the liquid crystal drive process comprising:
- a tone setting process of setting drive tones for each pixel of the plurality of pixels of the liquid crystal element based on a plurality of input tones of corresponding pixels of the input image;
- a drive process of controlling, depending on the set drive tones, a voltage applied to each corresponding pixel of the plurality of pixels of the liquid crystal element to a first voltage or a second voltage lower than the first voltage, in respective two or more sub-frame periods included in one frame period, to cause the corresponding pixel of the liquid crystal element to form a display tone; and
- a temperature acquisition process of acquiring a temperature of or around the liquid crystal element,
- wherein the tone setting process changes the drive tones to decrease, as the detected temperature increases, a drive tone corresponding to a maximum input tone of the plurality of input tones at which a period in which the first voltage is applied in the two or more sub-frame periods is maximum,
- wherein the change of one or more drive tones changes a total length of one or more first sub-frame periods, among the two or more sub-frame periods, in which the first voltage is applied to one or more corresponding pixels, and changes a total length of one or more second sub-frame periods thereamong, in which the second voltage is applied to one or more corresponding pixels, and
- wherein, when the detected temperature is higher than a predetermined temperature, as compared with when the detected temperature is lower than the predetermined temperature, the tone setter is configured to set the drive tones to decrease the total length of the one or more first sub-frame periods and increase the total length of the one or more second sub-frame periods.

* * * * *